(12) United States Patent
Zhao et al.

(10) Patent No.: US 10,969,314 B2
(45) Date of Patent: Apr. 6, 2021

(54) DEVICE AND METHOD FOR ANCHOR BOLT (CABLE) SUPPORTING STRUCTURE TEST AND ANCHORING SYSTEM PERFORMANCE COMPREHENSIVE EXPERIMENT

(71) Applicant: SHANDONG UNIVERSITY OF SCIENCE AND TECHNOLOGY, Qingdao (CN)

(72) Inventors: Tongbin Zhao, Qingdao (CN); Chunlin Li, Qingdao (CN); Minglu Xing, Qingdao (CN); Yunliang Tan, Qingdao (CN); Chen Zhao, Qingdao (CN); Zhi Wang, Qingdao (CN); Xiaoliang Li, Qingdao (CN); Fenghai Yu, Qingdao (CN); Jinglong Jia, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 16/976,163

(22) PCT Filed: Dec. 19, 2019

(86) PCT No.: PCT/CN2019/126547
§ 371 (c)(1),
(2) Date: Aug. 27, 2020

(87) PCT Pub. No.: WO2021/004015
PCT Pub. Date: Jan. 14, 2021

(65) Prior Publication Data
US 2021/0003490 A1    Jan. 7, 2021

(30) Foreign Application Priority Data

Jul. 5, 2019 (CN) .......................... 201910601543.1

(51) Int. Cl.
*G01N 3/10* (2006.01)
*G01N 3/22* (2006.01)
*G01N 3/24* (2006.01)

(52) U.S. Cl.
CPC ................. *G01N 3/10* (2013.01); *G01N 3/22* (2013.01); *G01N 3/24* (2013.01);
(Continued)

(58) Field of Classification Search
CPC ... G01N 2203/0017; G01N 2203/0021; G01N 2203/0025; G01N 2203/0048;
(Continued)

(56) References Cited

FOREIGN PATENT DOCUMENTS

| CN | 102621010 A | 8/2012 |
|---|---|---|
| CN | 103398901 A | 11/2013 |

(Continued)

OTHER PUBLICATIONS

International Search Report issued in corresponding International Application No. PCT/CN2019/126547, dated Apr. 2, 2020, The State Intellectual Property Office of the P.R. China, Beijing, China.

(Continued)

*Primary Examiner* — Jonathan M Dunlap
(74) *Attorney, Agent, or Firm* — Hauptman Ham, LLP

(57) ABSTRACT

The present disclosure provides a device and a method for an anchor bolt (cable) supporting structure test and an anchoring system performance comprehensive experiment, and relates to the technical field of anchoring tests. The device includes a gantry, a loading mechanism, a test mechanism and a test piece, wherein the gantry includes a base and an operation platform; the loading mechanism includes a loading frame, a chuck, a surrounding rock force loading oil cylinder and a hollow drawing oil cylinder; the test mechanism includes a load, a displacement and an acoustic emission and other monitoring mechanisms, and the test piece (Continued)

includes a rock test piece, an anchor bolt (cable), an anchor net, and the like; the loading mechanism and the hollow drawing oil cylinder are disposed on the base, and a torsion motor and an anchor bolt drill are disposed on the operation platform, wherein the rock test piece is placed between bearing plates, one end of the anchor bolt (cable) is fixed by the chuck or anchored into the rock test piece, and the other end of the anchor bolt (cable) passes through the hollow drawing oil cylinder. The device is capable of not only testing mechanical properties of the anchor bolt (cable) and an anchoring member, but also realizing simulation of a stress environment of "five sides loaded and one side non-loaded" so as to perform a surrounding rock drilling response or anchoring system performance comprehensive experiment.

9 Claims, 8 Drawing Sheets

(52) U.S. Cl.
CPC ............... *G01N 2203/0017* (2013.01); *G01N 2203/0021* (2013.01); *G01N 2203/0025* (2013.01); *G01N 2203/0048* (2013.01); *G01N 2203/0053* (2013.01)

(58) Field of Classification Search
CPC .... G01N 2203/0053; G01N 3/10; G01N 3/22; G01N 3/24
See application file for complete search history.

(56) References Cited

FOREIGN PATENT DOCUMENTS

| CN | 204008300 U | 12/2014 |
|----|-------------|---------|
| CN | 104406841 A | 3/2015 |
| CN | 106018100 A | 10/2016 |
| CN | 110274831 A | 9/2019 |

OTHER PUBLICATIONS

Written Opinion issued in corresponding International Application No. PCT/CN2019/126547, dated Apr. 2, 2020, The State Intellectual Property Office of the P.R. China, Beijing, China.
Chinese Office Action issued in corresponding Chinese Patent Application No. 2019106015431, dated Mar. 31, 2020.
Chinese Search Report issued in corresponding Chinese Patent Application No. 2019106015431, dated Mar. 24, 2020.
Notification to Grant Patent Right for Invention issued in corresponding Chinese Patent Application No. 2019106015431, dated Apr. 28, 2020.

DEVICE AND METHOD FOR ANCHOR BOLT (CABLE) SUPPORTING STRUCTURE TEST AND ANCHORING SYSTEM PERFORMANCE COMPREHENSIVE EXPERIMENT

RELATED APPLICATIONS

The present application is a U.S. National Phase of International Application Number PCT/CN2019/126547, filed Dec. 19, 2019, and claims the priority of Chinese Application No. 2019106015431, filed Jul. 5, 2019.

TECHNICAL FIELD

The present disclosure relates to the technical field of anchor bolt tests, and particularly to a device for an anchor bolt (cable) supporting structure test and an anchoring system performance comprehensive experiment and a method of performing an experiment by using the device.

BACKGROUND

At present, anchoring supporting technology is widely used in the engineering fields such as deep roadway and large-span underground cave supporting, reinforcement of a foundation and an abutment of a dam, rock-soil slope reinforcement, deep foundation pit supporting, water supply and traffic tunnels. A scientific supporting scheme may not only effectively guarantee the safety of works construction and production but also reduce costs to obtain the largest economic benefits. Experiments and engineering researches show that an anchor bolt essentially acts to reinforce surrounding rocks effectively so as to prevent occurrence of new opening cracks and slow down propagation of cracks, thereby avoiding large bed separation and slide of structural planes, keeping integrity of the surrounding rocks as possible, and preventing appearance of harmful deformation. High-performance anchor bolt supporting may transfer load distribution of rock soil masses, improve a stress state of a surrounding rock bearing structure within a supporting scope, and inhibit a tensile fracture resulted from a weak intercalation. Anchor bolt (cable) supporting in cooperation with anchor net may restrain deformation of surrounding rocks, adjust stress distribution of surrounding rocks, and prevent loosening and falling of local broken coal rock masses.

Since supporting applications such as an anchor bolt (cable) are subjected to a series of factors, such as geological structure, mining, tectonic pressure, anchoring technique, supporting parameter and material performance, although the current supporting design is made with certain criteria and references, the supporting parameter of an anchoring system is mainly determined based on engineering experiences. In this case, a poor application effect is produced due to insufficient structural knowledge of the surrounding rock and lack of systematic knowledge of an interaction mechanism of the anchoring system and the surrounding rocks. In the above influence factors, the properties of surrounding rocks around a roadway and a stress environment have great influence on anchoring supporting performances and anchoring force damage evolution. After a natural rock mass is disturbed by excavation, the roadway surrounding rocks will have significant structural deformation failures under the redistributed stress environment of "five sides loaded and one side non-loaded" along with stress release, crack initiation and even bed separation. The shallow surrounding rocks within a given scope close to the non-loaded side of the roadway have a higher stress concentration, and cannot realize long-term self-stabilization due to poorer stability. The deep surrounding rocks outside this scope have a better overall stability, a stronger bearing capacity and a higher stress and can be dynamically adjusted along with the deformation of the roadway. When anchoring supporting is performed under this condition, the anchored shallow and deep surrounding rocks with different properties under a stress environment interact with the supporting system for long according to complex interaction mechanism and interaction manner. The laws of the deformation failure and the supporting damage evolution of deep soft rocks will become more complex especially when the deep soft rocks are in latent plasticity or even a plasticity state.

At present, according to the current researches of the mechanical interaction mechanism of anchor bolt supporting, the mechanism of performing reinforcement and control for surrounding rocks by the anchor bolts under a specific geological condition is still not clear. Further, theoretical researches are limited by the existing experimental simulation methods. It is very costly to perform large test piece experiment on site. The existing indoor anchor bolt anchoring performance detection devices are generally designed for drawing researches of rock-like materials or concrete-filled steel pipe anchoring test pieces to evaluate an anchoring effect by drawing force detection or bearing capacity test of anchoring test pieces. An on-site geological environment of anchor bolt supporting cannot be directly simulated under such experimental condition, and problems such as stress distribution, surrounding rock properties and scale effects are not taken into account. Therefore, it is necessary to develop and research an innovative anchoring experiment device in order to realize a more systematic and more delicate experimental research. At the same time, an experimental system is required to be multifunctional in consideration of a great number of requirements of conventional mechanical performance tests of anchoring members and bearing performance tests of surrounding rock test piece.

SUMMARY

To implement a comprehensive test for each performance of an anchor bolt and simulate on-site bolt-net combined supporting for testing, the present disclosure provides a device and a method for an anchor bolt (cable) supporting structure test and an anchoring system performance comprehensive experiment. A specific technical solution is described below.

The device for an anchor bolt supporting structure test and an anchoring system performance comprehensive experiment includes a gantry, a loading mechanism, a test mechanism and a test piece. The gantry includes a base and an operation platform; the loading mechanism includes a loading frame, an anchor bolt chuck, a bearing plate, a hollow drawing oil cylinder and a plurality of loading oil cylinders, the loading frame is disposed on a through-groove of the base, the anchor bolt chuck is disposed at an end of the loading frame, and the loading oil cylinder is disposed at a side surface of the loading frame and acts on the bearing plate; the hollow drawing oil cylinder is disposed at an end of the loading frame and opposite to the anchor bolt chuck; the test mechanism includes a stress sensor and a displacement sensor, an acoustic emission probe, a torsion motor and an anchor bolt drill, the torsion motor and the anchor bolt drill are both disposed on the operation platform, the stress sensor and the displacement sensor are disposed on the bearing plate, and the acoustic emission probe is disposed on the loading frame; the test piece includes a test anchor bolt, one end of the test anchor bolt is fixed at a side of the loading frame, and the other end of the test anchor bolt passes through the hollow drawing oil cylinder.

Preferably, the through-groove is disposed at an upper surface of the base, and a depth of the through-groove is greater than an exposed length of the installed loading oil cylinder; the operation platform is disposed opposite to the base, a sliding rail is disposed at an upper surface of the operation platform, a sliding block moves along the sliding rail in cooperation with the sliding rail, a sliding groove is further disposed at an upper surface of the sliding block, the anchor bolt drill and the torsion motor move along the sliding groove or fixed on the sliding groove respectively, and sliding rollers are further disposed at both sides of the sliding grooves.

Preferably, the loading frame includes one or more dual-shaft frames, and two groups of loading oil cylinders distributed vertically and correspondingly are disposed on the dual-shaft frame to apply a load in a plane determined by the dual-shaft frame; an axial hollow loading oil cylinder is further disposed on the dual-shaft frame on which the anchor bolt chuck is connected along an axial direction of the test anchor bolt; four corners of the dual-shaft frames are connected through pillars and nuts, the bearing plate includes a shear bearing plate and a plane bearing plate, and a loading end of the loading oil cylinder is connected to the shear bearing plate or the plane bearing plate.

Preferably, an acoustic emission probe installation groove is disposed at an inner side of the loading frame, the displacement sensors and the stress sensors are disposed on the bearing plates; torque, power and thrust monitoring devices are disposed on the anchor bolt drill, and a drilling scrap collection device is further disposed at a drilling side of the anchor bolt drill.

More preferably, the test piece further includes a rock test piece, a steel strip, an anchor net and a tray; the rock test piece is placed in a space enclosed by the plane bearing plates, and the shear bearing plate is staggeredly engaged with the test anchor bolt.

More preferably, the hollow drawing oil cylinder is disposed on a door plate hinged with a connection support, and an anchor net fixing hole and a steel strip fixing hole are further disposed on the connection support; a hollow bearing plate is disposed at a loading end of the hollow drawing oil cylinder, the anchor net is pressed onto the hollow bearing plate, and the steel strip and the tray are pressed onto the anchor net sequentially.

An anchor bolt detection method using the above device for an anchor bolt supporting structure test and an anchoring system performance comprehensive experiment includes steps of: firstly, fixing one end of the test anchor bolt on the anchor bolt chuck, and fixing the other end of the test anchor bolt on the hollow bearing plate through the nut and the tray; and then, performing axial loading by the hollow drawing oil cylinder, and recording stress and deformation of the anchor bolt in the loading process.

An anchor bolt detection method using the above device for an anchor bolt supporting structure test and an anchoring system performance comprehensive experiment includes steps of: firstly, fixing one end of the test anchor bolt on the anchor bolt chuck, opening the door plate where the hollow drawing oil cylinder is located, and fixedly installing the torsion motor on the operation platform; then, fixing the other end of the test anchor bolt on the torsion motor of the operation platform; and then, applying a load to the anchor bolt through the torsion motor, and recording a torque, a rotation speed and anchor bolt deformation in the loading process.

An anchor bolt detection method using the above device for an anchor bolt supporting structure test and an anchoring system performance comprehensive experiment includes steps of: firstly, connecting the shear bearing plate to the loading end of the loading oil cylinder, fixing one end of the test anchor bolt on the anchor bolt chuck, and adjusting a position of the shear bearing plate through the loading oil cylinder to engage the shear bearing plate with the test anchor bolt; then, fixing the other end of the test anchor bolt on the hollow bearing plate through the nut and the tray; and then, performing loading by the loading oil cylinder, and recording stress and deformation of the anchor bolt in the loading process.

A method of testing a bolt-net combined supporting performance using the above device for an anchor bolt supporting structure test and an anchoring system performance comprehensive experiment includes the following steps.

At step A, the plane bearing plate is installed on the loading end of the loading oil cylinder, the rock test piece is transported to a loading space between the plane bearing plates, and the loading oil cylinders and the axial hollow loading oil cylinder are adjusted to clamp the rock test piece.

At step B, the door plate where the hollow drawing oil cylinder is located is opened, the anchor bolt drill is fixedly installed on the operation platform, and the loading oil cylinders and the axial hollow loading oil cylinder are adjusted to performing loading respectively so as to simulate an actual geostress.

At step C, the anchor bolt drill is started to drill a drill hole along an axial direction of the rock test piece relative to a central hole of the anchor bolt chuck, and a torque, a rotation speed, power, a thrust and a drilling speed of the anchor bolt drill and a deformation of the rock test piece in the drilling process are recorded.

At step D, a drill rod is retreated after drilling is completed, the door plate where the hollow drawing oil cylinder is located is closed, and the test anchor bolt and an anchoring agent are directed into the drill hole simultaneously.

At step E, after the anchoring agent is solidified, a pretightening force is applied to the anchor bolt, and the steel strip, the anchor net and the tray are installed.

At step F, the force and deformation of the anchor bolt when the surrounding rocks are disturbed are simulated by adjusting the loading of the loading oil cylinders; or a combined supporting capability of the anchor bolt, the anchor net and the steel strip is tested by the hollow drawing oil cylinder; at the same time, the forces and the deformations of the steel strip, the anchor net, the tray, the anchor bolt and the rock test piece in the loading process are recorded.

The present disclosure has the following beneficial effects.

(1) The device for an anchor bolt (cable) supporting structure test and an anchoring system performance comprehensive experiment according to the present disclosure may simulate the actual geostress condition using the loading mechanism, apply a drawing force to the anchor bolt by using the hollow drawing oil cylinder of the test mechanism, provide a torsion force by using the torsion motor and simulate a drilling process of an anchor bolt drill hole by using the anchor bolt drill, and restore a real anchoring situation through the test anchor bolt, the anchor net, the steel strip and the tray, thereby testing the bolt-net combined anchoring performance. The device can further implement several anchor bolt performance tests in cooperation with different mechanisms, and also simulate and restore a real geostress condition, an anchor bolt installation condition and a combined supporting condition.

(2) To research anchoring performances, bearing capacities, anchoring force damage evolution laws, influence factors and the like of anchoring members such as the anchor bolt (cable) under different surrounding rock environments and understand the anchoring mechanism of the anchor bolt clearly, the device can realize two-dimensional plane loading on the rock test piece using the loading oil cylinder disposed on the dual-shaft frame, and different oil cylinders may better simulate the real geostress conditions through respective loading and synergic action; the axial hollow loading oil cylinder may realize axial loading perpendicular to the two-dimensional plane and simulate the force of surrounding rocks along the direction of the anchor bolt. Paired disposal of the loading oil cylinders may jointly correct eccentricity of the rock test piece, and can also enable the anchor bolt drill hole to stay at an axis of an experimental machine during experiment; simulation of "five sides loaded and one side non-loaded" of the test piece can be realized by loading in five directions and thus a surrounding rock drilling response process under the stress environment may be observed, and an indoor anchoring system performance comprehensive experiment is performed.

(3) Since the device is subjected to a large force on the whole, the base can guarantee the stability of the device in the process of simulating the geostress and the anchor bolt force; the operation platform is opposite to the base and configured with the torsion motor and the anchor bolt drill so as to perform a torsion experiment of the anchor bolt and simulate the process of drilling the anchor bolt drill hole and the anchoring process; the overall functions of the experimental device can be better exerted by replacing the shear bearing plate or the plane bearing plate, and the shear resistance performance test of the anchor bolt is performed by the shear bearing plate.

(4) By using the experimental device, several anchor bolt detection experiments such as an anchor bolt drawing experiment, an anchor bolt shear resistance experiment and an anchor bolt torsion experiment may be performed; by using the method, the experimental machine may repeat the experiment, bringing ease of operation; in addition, by using the device, the geostress environment to which the surrounding rocks are subjected may be simulated completely, and drilling and installation of the anchor bolt drill hole may be simulated accurately. After installation, the test of the combined supporting performances can be continued using the device in cooperation with the anchor net and the steel strip. The device and the method further have advantages such as flexible operation and control, and reflection of the actual engineering situations.

Figure 1:
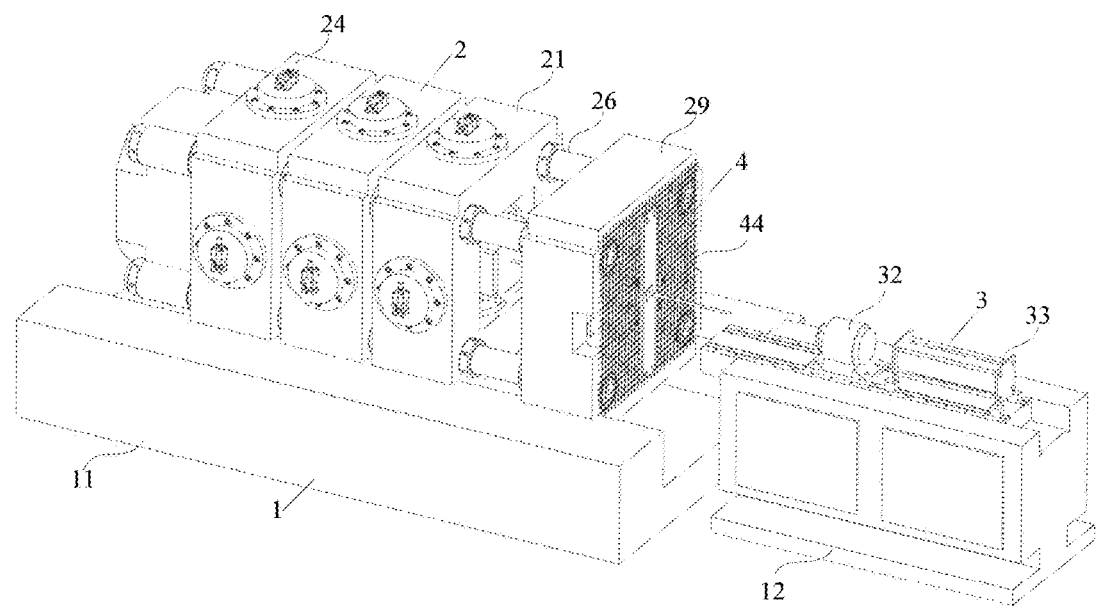
FIG. 1 is a structural schematic diagram illustrating a device for an anchor bolt (cable) supporting structure test and an anchoring system performance comprehensive experiment according to an example of the present disclosure.

Numerals of the drawings are described as follows: 1—gantry; 11—base; 111—through-groove; 12—operation platform; 121—sliding rail; 122—sliding block; 123—sliding groove; 124—sliding roller; 2—loading mechanism; 21—loading frame; 211—dual-shaft frame; 22—anchor bolt chuck; 23—bearing plate; 231—shear bearing plate; 232—plane bearing plate; 233—connection plate; 234—loading plate; 235—connection shaft; 24—loading oil cylinder; 25—axial hollow loading oil cylinder; 26—pillar; 27—nut; 28—door plate; 29—connection support; 3—test mechanism; 31—hollow drawing oil cylinder; 32—torsion motor; 33—anchor bolt drill; 34—hollow bearing plate; 4—test piece; 41—test anchor bolt; 42—rock test piece; 43—steel strip; 44—anchor net; 45—tray; 5—bed-separation jack.

DETAILED DESCRIPTION OF THE EMBODIMENTS

As shown in FIGS. 1-16, specific examples of a device and a method for an anchor bolt (cable) supporting structure test and an anchoring system performance comprehensive experiment are described below.

Since a bolt-net combined supporting mechanism is complex, most anchoring failure cases are those cases in which the failures of the bolt-net combined supporting or anchor bolt supporting result from complex geostress conditions. The existing experimental devices generally are used to test a particular performance of an anchor bolt. To carrying out research on the anchor bolt supporting mechanism and the bolt-net combined supporting mechanism as well as the failures resulted from geostress change and solve problems that several experimental devices are needed to test different anchor bolt performances without simulating and restoring the real anchor bolt force and so on, a device for an anchor bolt (cable) supporting structure test and an anchoring system performance comprehensive experiment and a method of performing experiment by using the device are designed to provide convenience for researching anchoring performances, bearing capacities, anchoring force damage evolution laws and influence factors under different surrounding rock environments and exploring an anchoring mechanism of the anchor bolt and the anchor cable. In addition, although the anchor bolt is taken as an example herein, the device and the method for testing the anchor bolt and the anchor cable can be realized through a simple conventional transformation.

Example 1

A structure of a device for an anchor bolt (cable) supporting structure test and an anchoring system performance comprehensive experiment includes a gantry 1, a loading mechanism 2, a test mechanism 3 and a test piece 4. As shown in FIGS. 1-5, the gantry 1 includes a base 11 and an operation platform 12, the loading mechanism 2 includes a loading frame 21, an anchor bolt chuck 22, a bearing plate 23, a hollow drawing oil cylinder 31 and a plurality of loading oil cylinders 24, the test mechanism 3 includes a torsion motor 32, an anchor bolt drill 33, and monitoring devices such as an acoustic emission probe, a stress sensor and a displacement sensor, and the test piece 4 includes anchoring members such as a test anchor bolt 41, a rock test piece 42, a steel strip 43, an anchor net 44 and a tray 45. The device may simulate an actual geostress condition using the loading mechanism 2, apply a drawing force to the test anchor bolt 41 by using the hollow drawing oil cylinder 31 of the test mechanism 3, provide a torsion force by using the torsion motor 32 and simulate a process of drilling a anchor bolt drill hole by using the anchor bolt drill 33. Thus, a real anchoring situation can be restored through the test anchor bolt 41, the anchor net 44, the steel strip 43 and the tray 45, thereby testing a bolt-net combined anchoring performance. The device further can carry out several anchor bolt performance tests in cooperation with different mechanisms, and also simulate and restore a real geostress condition, an anchor bolt installation condition and a combined supporting condition.

Figure 2:
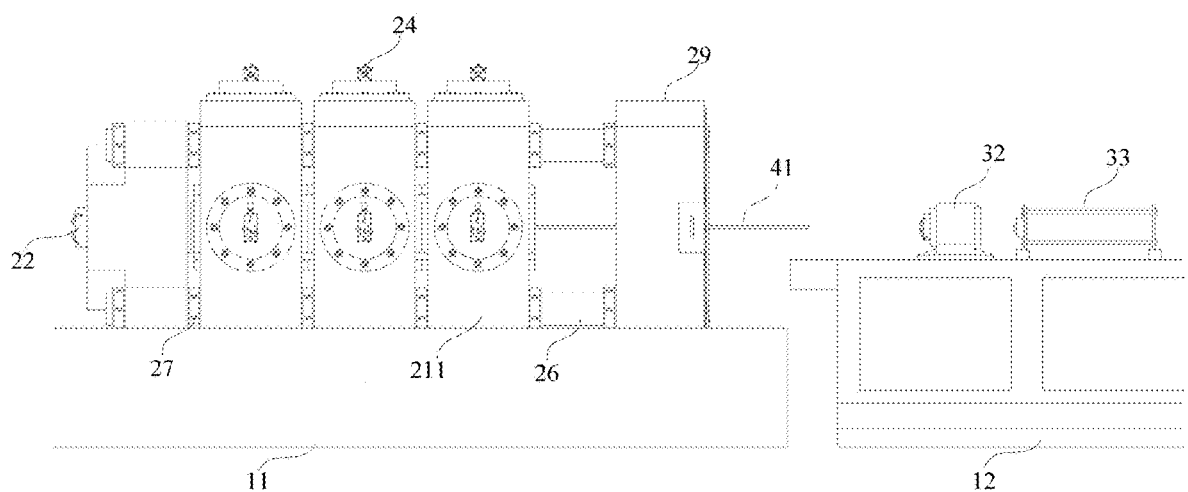
FIG. 2 is a front structural schematic diagram illustrating an experimental device according to an example of the present disclosure.
Figure 3:
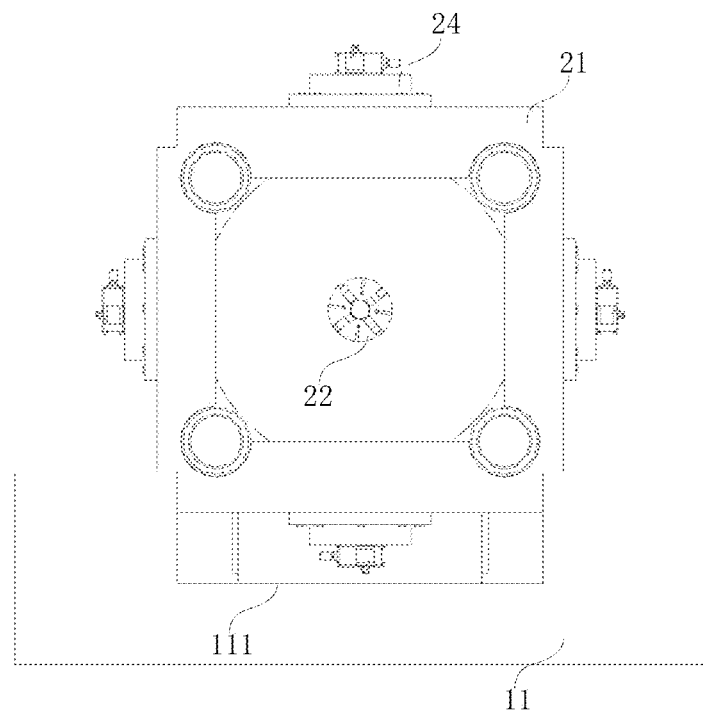
FIG. 3 is a side structural schematic diagram illustrating an experimental device according to an example of the present disclosure.
Figure 4:
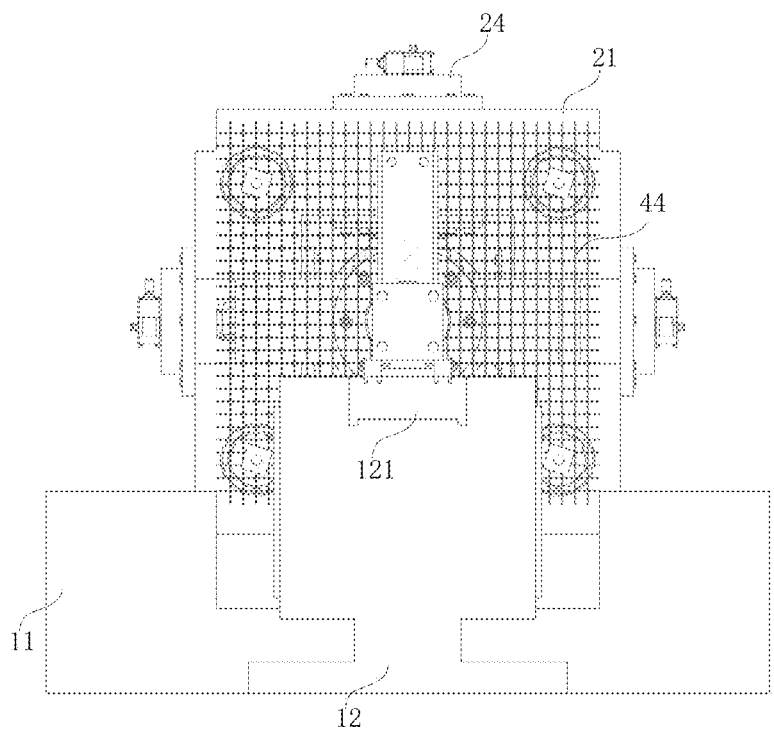
FIG. 4 is another side structural schematic diagram illustrating an experimental device according to an example of the present disclosure.

The gantry includes the base 11 and the operation platform 12, the base 11 is used to fix each component of the loading mechanism 2, and the operation platform 12 is mainly used to assist the working of the torsion motor 32 and the anchor bolt drill 33. A through-groove 111 may be disposed at an upper surface of the base 11 with a depth of the through-groove 111 greater than an exposed length of the installed loading oily cylinder 24 so as to ensure installation of the loading oil cylinder 24 and the loading frame 21. The loading frame 21 may be fixed on the through-groove 111 of the base. As shown in FIG. 2, the operation platform 12 is disposed opposite to the base 11. Specifically, a height of the operation platform 12 is appropriate to the working of the torsion motor 32 and the anchor bolt drill 33 so as to facilitate cooperation. A sliding rail 121 is disposed at an upper surface of the operation platform 12, a sliding block 122 moves along the sliding rail in cooperation with the sliding rail 121, and distances of the torsion motor 32 and the anchor bolt drill 33 on the sliding block from the test piece 4 on the base 11 may be adjusted by sliding the sliding block 122 to facilitate operation. A sliding groove 123 is further disposed at an upper surface of the sliding block 122, the anchor bolt drill 33 and the torsion motor 32 move along the sliding groove 123 respectively or are fixed on the sliding groove 123, and sliding rollers 124 are further disposed at both sides of the sliding grooves 123 to reduce an impact of a friction force on installation of the test piece.

Figure 5:
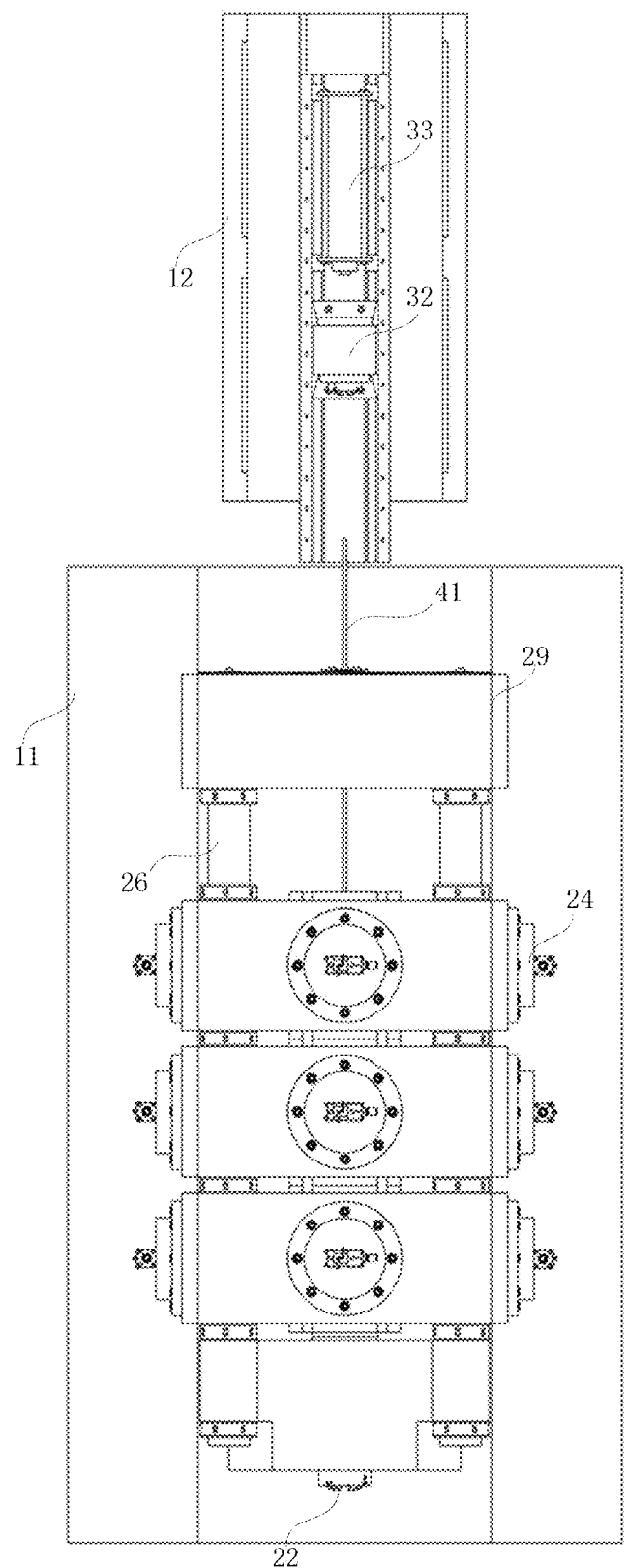
FIG. 5 is a top structural schematic diagram illustrating an experimental device according to an example of the present disclosure.
Figure 10:
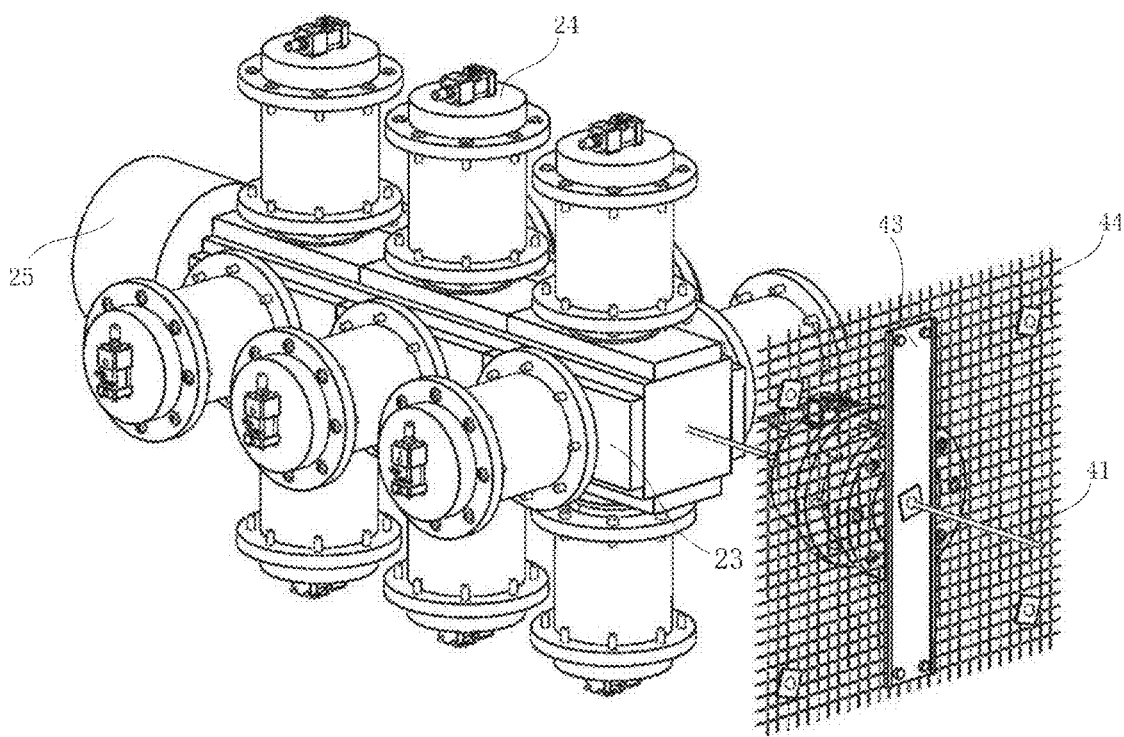
FIG. 10 is a schematic diagram illustrating a bolt-net combined supporting structure test according to an example of the present disclosure.
Figure 11:
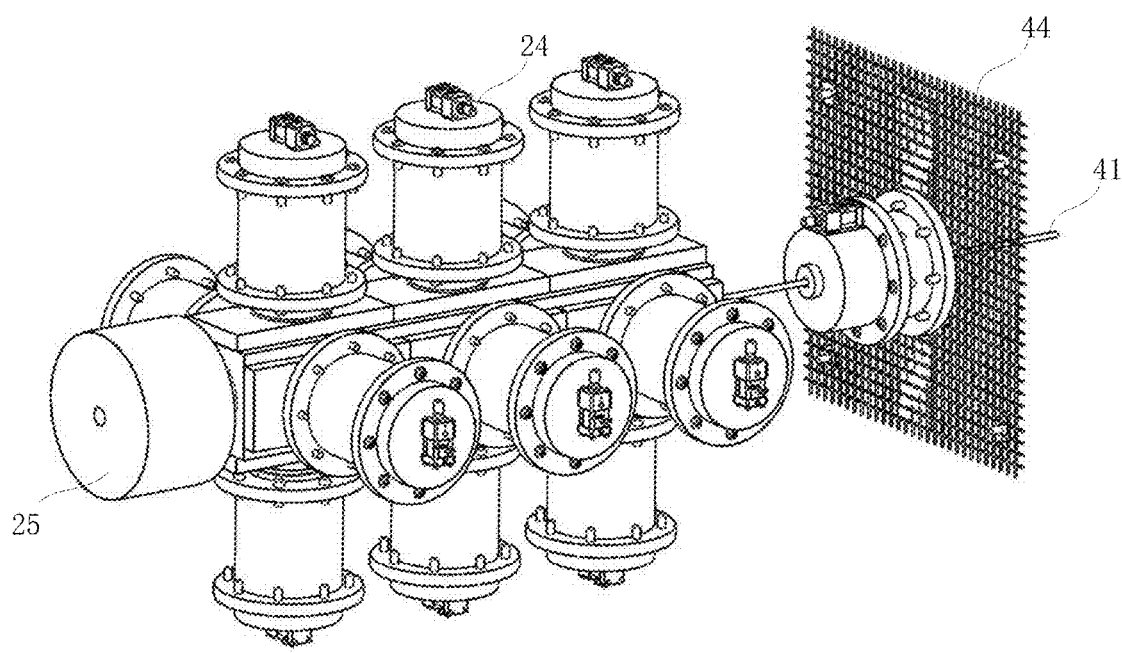
FIG. 11 is a schematic diagram illustrating a bolt-net combined supporting structure test from another angle according to an example of the present disclosure.

The loading mechanism 2 includes a loading frame 21, an anchor bolt chuck 22, a bearing plate 23 and a plurality of loading oil cylinders 24. As shown in FIG. 5, and FIGS. 10-11, the loading frame 21 is disposed on the through-groove 111 of the base to fix the loading oil cylinders 24, and the anchor bolt chuck 22 is disposed at an end of the loading frame 21 to limit and fix the test anchor bolt 41. The loading frame 21 is square, the loading oil cylinders 24 are disposed at all side surfaces of the loading frame 21 and act on the bearing plate 23. The loading frame 21 includes one or more dual-shaft frames 211 to effectively simulate a complex geostress environment by performing loading with a plurality of dual-shaft frames 211. Two groups of loading oil cylinders 24 distributed vertically and correspondingly are disposed on the dual-shaft frame 211 to apply a load in a two-dimensional plane determined by the dual-shaft frame 211. In addition, an axial hollow loading oil cylinder 25 is further disposed in an axial direction perpendicular to the two-dimensional plane, that is, in an axial direction of the test anchor bolt on the dual-shaft frame 211 on which the anchor bolt chuck 22 is connected, and the axial hollow loading oil cylinder 25 performs axial loading for the placement side of the rock test piece 42. Four corners of the dual-shaft frames 211 are connected through pillars 26 and nuts 27, the pillars 26 pass through the dual-shaft frames 211, and both ends of the pillars may be fixed by the nuts 27. Loading may be performed for the two-dimensional plane of the rock test piece by using the loading oil cylinders 24 disposed on the dual-shaft frame 211, and different oil cylinders may better simulate the real geostress condition better through respective loading and synergy; the axial hollow loading oil cylinder 25 may realize axial loading perpendicular to the two-dimensional plane and simulate the force of the surrounding rock along the direction of the anchor bolt; the axial hollow loading oil cylinder, also called a rear loading oil cylinder, can realize non uniform loading of five sides together with the oil cylinders on the dual-shaft frame; simulation of "five sides loaded and one side non-loaded" of the test piece is realized by loading in five directions, a surrounding rock drilling response process under the stress environment is observed, and an indoor anchoring system performance comprehensive experiment is performed. The bearing plate 23 includes a shear bearing plate 231 and a plane bearing plate 232, and a loading end of the loading oil cylinder 24 is connected to the shear bearing plate or the plane bearing plate. The rock test piece 42 is placed in a space enclosed by the plane bearing plates 232, and the shear bearing plate 231 is staggeredly engaged with the test anchor bolt 41. The overall functions of the experimental device may be better exerted by replacing the shear bearing plate 231 or the plane bearing plate 232, and an anchor bolt shear resistance performance test may be performed by using the shear bearing plate 231.

The test mechanism 3 includes a hollow drawing oil cylinder 31, the torsion motor 32 and the anchor bolt drill 33.

Figure 13:
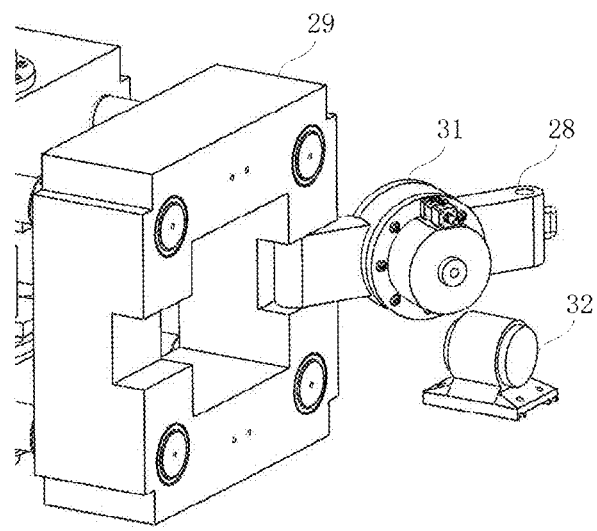
FIG. 13 is a structural schematic diagram illustrating installation of a connection support and a hollow drawing oil cylinder according to an example of the present disclosure.

The hollow drawing oil cylinder 31 is disposed at an end of the loading frame 21 and opposite to the anchor bolt chuck 22. Specifically, the hollow drawing oil cylinder 31 and the anchor bolt chuck 22 are coaxially arranged, the torsion motor 32 and the anchor bolt drill 33 are both disposed on the operation platform 12, and the working axes of the torsion motor 32 and the anchor bolt drill 33 also coincide with the anchor bolt chuck 22. As shown in FIG. 13, the hollow drawing oil cylinder 31 is disposed on a door plate 28 hinged with a connection support 29, the connection support 29 is fixed at an end of the pillar 26, and an anchor net fixing hole and a steel strip fixing hole are further disposed on the connection support 29. A hollow bearing plate 34 is disposed at a loading end of the hollow drawing oil cylinder 31, and a through-hole corresponding to the hollow drawing oil cylinder 31 is disposed on the hollow bearing plate 34.

The test piece 4 includes a test anchor bolt 41. One end of the test anchor bolt is fixed at a side of the loading frame, and specifically is fixed through the anchor bolt chuck or directly anchored onto the rock test piece in the loading frame, and the other end of the test anchor bolt passes through the hollow drawing oil cylinder. The test piece further includes a rock test piece 42, a steel strip 43, an anchor net 44 and a tray 45. The anchor net 44 is pressed onto the hollow bearing plate 34, and the steel strip 43 and the tray 45 are pressed onto the anchor net 44 sequentially. Alternatively, only the anchor net 44 and the tray 45 are disposed without the steel strip.

Figure 6:
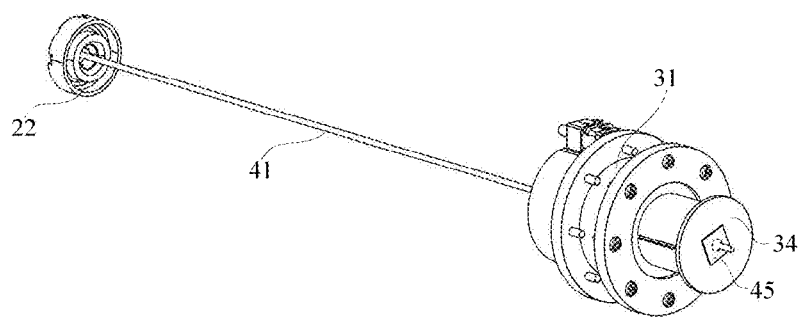
FIG. 6 is a structural schematic diagram illustrating a principle of a drawing experiment of an anchor bolt according to an example of the present disclosure.

As shown in FIG. 6, an anchor bolt detection method using the above device for an anchor bolt supporting structure test and an anchoring system performance comprehensive experiment includes steps of: firstly, fixing one end of the test anchor bolt on the anchor bolt chuck, and fixing the other end of the test anchor bolt on the hollow bearing plate through the nut and the tray; and then, performing axial loading by the hollow drawing oil cylinder, and recording force and deformation of the anchor bolt in the loading process. The detection may be repeated by using the device.

Figure 7:
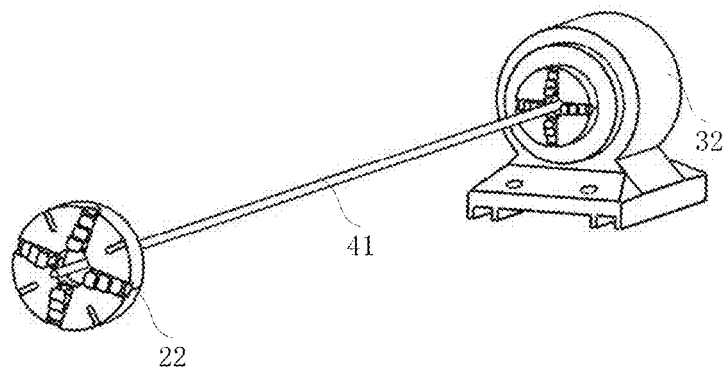
FIG. 7 is a structural schematic diagram illustrating a principle of a torsion experiment of an anchor bolt according to an example of the present disclosure.

As shown in FIG. 7, an anchor bolt detection method using the above device for an anchor bolt supporting structure test and an anchoring system performance comprehensive experiment includes steps of: firstly, fixing one end of the test anchor bolt on the anchor bolt chuck, opening the door plate where the hollow drawing oil cylinder is located, and fixedly installing the torsion motor on the operation platform; then, fixing the other end of the test anchor bolt on the torsion motor of the operation platform; and then, applying a load to the anchor bolt through the torsion motor, and recording a torque and a rotation speed and anchor bolt deformation in the loading process. The detection may be repeated by using the device.

Figure 8:
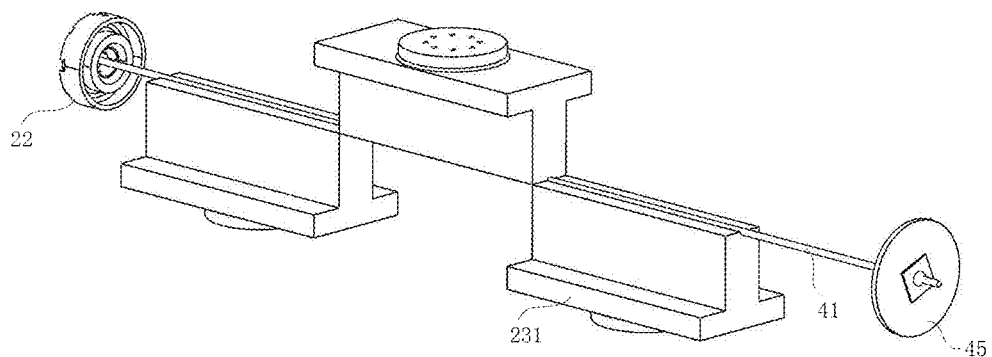
FIG. 8 is a structural schematic diagram illustrating a principle of a shear experiment of an anchor bolt according to an example of the present disclosure.
Figure 9:
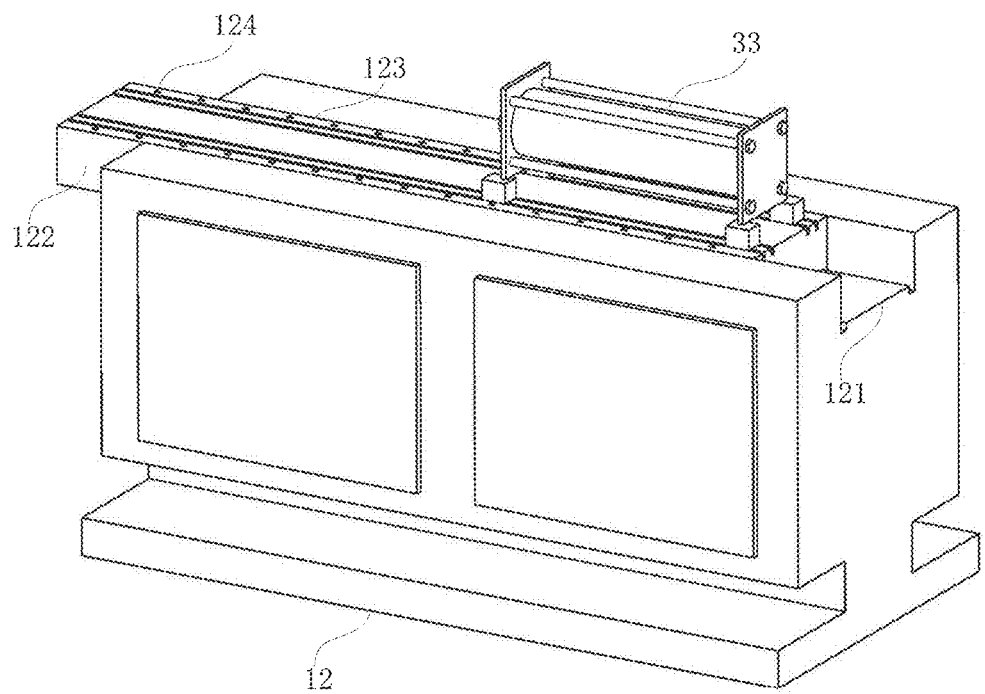
FIG. 9 is a structural schematic diagram illustrating installation of an anchor bolt drill according to an example of the present disclosure.

As shown in FIG. 8, an anchor bolt detection method using the above device for an anchor bolt supporting structure test and an anchoring system performance comprehensive experiment includes steps of: firstly, connecting the shear being plate to the loading end of the loading oil cylinder, fixing one end of the test anchor bolt on the anchor bolt chuck, and adjusting a position of the shear bearing plate through the loading oil cylinder to engage the shear bearing plate with the test anchor bolt; then, fixing the other end of the test anchor bolt on the hollow bearing plate through the nut and the tray; and then, performing loading by the loading oil cylinder, and recording force and deformation of the anchor bolt in the loading process. The detection may be repeated by using the device.

As shown in FIGS. 6-8, the above device for anchor bolt detection and a bolt-net combined supporting performance test performs several anchor bolt detection experiments, including an anchor bolt drawing experiment, an anchor bolt shear resistance experiment, an anchor bolt torsion experiment and a bolt-net combined supporting experiment. The experimental machine may repeat the above experiment by using the above method, and performing experiment by using the device has advantages such as a simple and convenient operation and a reliable experimental result.

Example 2

A structure of a device for an anchor bolt supporting structure test and an anchoring system performance comprehensive experiment includes a gantry 1, a loading mechanism 2, a test mechanism 3 and a test piece 4. The gantry 1 includes a base 11 and an operation platform 12, the loading mechanism 2 includes a loading frame 21, an anchor bolt chuck 22, a bearing plate 23, a hollow drawing oil cylinder 31 and 12 loading oil cylinders 24. The test mechanism 3 includes a torsion motor 32, an anchor bolt drill 33, and monitoring devices such as an acoustic emission probe, a stress sensor and a displacement sensor. The test piece 4 includes a test anchor bolt 41, a rock test piece 42, a steel strip 43, an anchor net 44 and a tray 45.

The gantry includes the base 11 and the operation platform 12, the base 11 is used to fix each component of the loading mechanism 2, and the operation platform 12 is mainly used to assist the working of the torsion motor 32 and the anchor bolt drill 33. A through-groove 111 is disposed at an upper surface of the base 11, a depth of the through-groove 111 is greater than an exposed length of the installed loading oily cylinder 24, and the loading frame 21 may be fixed on the through-groove 111 of the base. The operation platform 12 is disposed opposite to the base 11. Specifically, a height of the operation platform 12 is appropriate to the working of the torsion motor 32 and the anchor bolt drill 33 to facilitate cooperation. A sliding rail 121 is disposed at an upper surface of the operation platform 12, a sliding block 122 moves along the sliding rail in cooperation with the sliding rail 121, and a distance of the anchor bolt drill 33 on the sliding block from the test piece 4 on the base 11 may be adjusted by sliding the sliding block 122 to facilitate operation. A sliding groove 123 is further disposed at an upper surface of the sliding block 122, the anchor bolt drill 33 and the torsion motor 32 move along the sliding groove 123 respectively or are fixed on the sliding groove 123, and sliding rollers 124 are further disposed at both sides of the sliding grooves 123 to reduce an impact of a friction force on installation of the test piece.

The loading mechanism 2 includes a loading frame 21, an anchor bolt chuck 22, a bearing plate 23 and a plurality of loading oil cylinders 24. The loading frame 21 is disposed on the through-groove 111 of the base to fix the loading oil cylinders 24, and the anchor bolt chuck 22 is disposed at an end of the loading frame 21 to limit and fix the test anchor bolt 41. The loading frame 21 is square, the loading oil cylinders 24 are disposed at all side surfaces of the loading frame 21 and act on the bearing plate 23; the loading frame 21, the base 12 and the pillar 26 need to be manufactured with a material with high rigidity. The loading frame 21 includes 3 dual-shaft frames 211 to simulate the complex geostress environment effectively by performing loading through 3 dual-shaft frames 211. Two groups of loading oil cylinders 24 distributed vertically and correspondingly are disposed on the dual-shaft frame 211 to apply a load in a two-dimensional plane determined by the dual-shaft frame 211, the adjacent dual-shaft frames 211 are arranged in parallel, and the loading oil cylinder 24 is an oil cylinder with a large stroke. In addition, an axial hollow loading oil cylinder 25 is further disposed along an axial direction perpendicular to the two-dimensional plane, that is, in an axial direction of the test anchor bolt on the dual-shaft frame 211 on which the anchor bolt chuck 22 is connected, and the axial hollow loading oil cylinder 25 performs axial loading for the placement side of the rock test piece 42 to simulate the geostress along the direction of the anchor bolt. In this case, the state of "one-side non-loaded" of the surrounding rocks when the anchor bolt drill hole is drilled may also be simulated. A stop clamp may be disposed at a non-loaded side of the loading frame to ensure the stability of the rock test piece in the loading process. Four corners of the dual-shaft frames 211 are connected through pillars 26 and nuts 27, the pillars 26 pass through the dual-shaft frames 211, and both ends of the pillars may be fixed by the nuts 27. The bearing plate 23 specifically is a single plane bearing plate 232, the loading end of each loading oil cylinder 24 is connected to the plane bearing plate respectively, and a space enclosed by the plane bearing plates 232 is used to place the rock test piece 42. A stress sensor and a displacement sensor are disposed at the surface of the plane bearing plates and the pillars described above to monitor displacement and stress changes in the experimental process.

Figure 14:
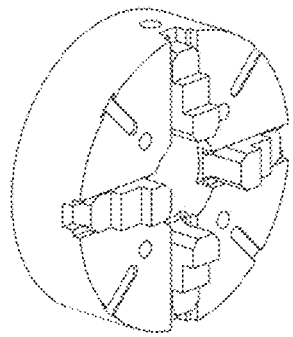
FIG. 14 is a structural schematic diagram illustrating an anchor bolt chuck according to an example of the present disclosure.

The hollow drawing oil cylinder 31 is disposed at an end of the loading frame 21 and opposite to the anchor bolt chuck 22. As shown in FIG. 14, the anchor bolt chuck is a short-cylinder four-claw chuck. Specifically, the hollow drawing oil cylinder 31 and the anchor bolt chuck 22 are axially arranged, the anchor bolt drill 33 is disposed on the operation platform 12, and the working axis of the anchor bolt drill 33 also coincides with the anchor bolt chuck 22. The hollow drawing oil cylinder may also be replaced with an impact loading oil cylinder so as to simulate the forces received by the anchor bolt or the bolt-net under an impact load. As shown in FIG. 13, the hollow drawing oil cylinder 31 is disposed on the door plate 28 hinged with a connection support 29, the door plate 28 may be opened or closed through a hinged position to facilitate installing the test piece, the other side of the door plate may be fixedly locked on the connection support 29 fixed at an end of the pillar 26, and an anchor net fixing hole and a steel strip fixing hole are further disposed on the connection support 29 to fix the anchor net and the steel strip. A hollow bearing plate 34 is disposed at a loading end of the hollow drawing oil cylinder 31, and a through-hole corresponding to the hollow drawing oil cylinder 31 is disposed on the hollow bearing plate 34.

The test mechanism 3 includes the torsion motor 32 and the anchor bolt drill 33, and monitoring devices such as the stress sensor and the displacement sensor, and the acoustic emission probe. The high precision stress sensor and the high precision displacement sensor are disposed in all loading oil cylinders 24, the hollow drawing oil cylinder 31 and the axial hollow loading oil cylinder 25 described above, and servo loading can also be realized. In addition, an acoustic emission probe installation groove is further disposed at an inner side of the loading frame to place the acoustic emission probe. The displacement sensor and the stress sensor are disposed on all bearing plates. Thus, several groups of displacement sensors and stress sensors can monitor deformation and loading situations of the test piece cooperatively. Torsion, power and thrust monitoring devices are disposed on the anchor bolt drill, and a drilling scrap collection device is further disposed at a drilling side of the anchor bolt drill. With these monitoring devices, the working data of the anchor bolt drill and the data of an anchor bolt drilling response can be monitored in real time.

The test piece 4 further includes a test anchor bolt 41. One end of the test anchor bolt 41 is fixed by the anchor bolt chuck 22 or directly anchored into the rock test piece, and the other end of the test anchor bolt 41 passes through the hollow drawing oil cylinder 31. The test piece 4 further includes a rock test piece 42, a steel strip 43, an anchor net 44 and a tray 45. The rock test piece 42 is a cuboidal test piece with its size matched with the space enclosed by the plane bearing plates 232, the anchor net 44 is pressed onto the hollow bearing plate 34, the steel strip 43 and the tray 45 are pressed onto the anchor net 44 sequentially. Alternatively, only the anchor net 44 and the tray 45 may be disposed without the steel strip.

A process of drilling the anchor bolt drill hole may be simulated by using the above experimental device, which specifically includes the following steps.

Firstly, the plane bearing plate is installed on the loading end of the loading oil cylinder and the rock test piece is transported to a loading space between the plane bearing plates, and the loading oil cylinders and the axial hollow loading oil cylinder are adjusted to clamp the rock test piece; then, the door plate where the hollow drawing oil cylinder is located is opened, the anchor bolt drill is fixedly installed on the operation platform, and the loading oil cylinder and the axial hollow loading oil cylinder are adjusted to perform loading respectively so as to simulate the actual geostress; then, the anchor bolt drill is started to drill a drill hole along an axial direction of the rock test piece relative to a central hole of the anchor bolt chuck, and a torque, a rotation speed and a drilling speed of the anchor bolt drill and a deformation of the rock test piece in the drilling process are recorded. In this process, the simulation of the actual geostress is maintained, the stress sensor and the displacement sensor are disposed in the rock test piece, and the acoustic emission probe may be further disposed. In this way, a change of the surrounding rocks in the drilling process of the anchor bolt can be simulated accurately with experimental data recorded so as to provide a theoretical basis for the drilling of the anchor bolt drill hole. In the experimental process, the rock test piece is loaded in five directions with one side non-loaded, thereby simulating a real stress state of the roadway surrounding rocks very well.

Figure 12:
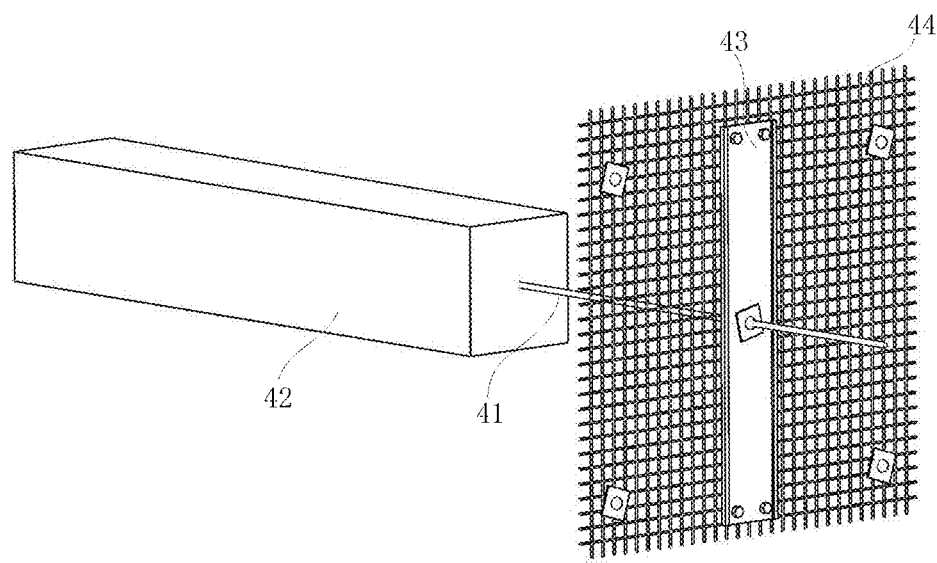
FIG. 12 is a schematic diagram illustrating a combination structure of a test piece and a bolt-net combined supporting structure according to an example of the present disclosure.

As shown in FIGS. 10-12, a method of testing a bolt-cable combined supporting performance using the above device for an anchor bolt supporting structure test and an anchoring system performance comprehensive experiment includes the following steps.

At step A, the plane bearing plate is installed on the loading end of the loading oil cylinder and the rock test piece is transported to a loading space between the plane bearing plates, and the loading oil cylinders and the axial hollow loading oil cylinder are adjusted to clamp the rock test piece.

At step B, the door plate where the hollow drawing oil cylinder is located is opened, the anchor bolt drill is fixedly installed on the operation platform, and the loading oil cylinders and the axial hollow loading oil cylinder are adjusted to perform loading respectively so as to simulate actual geostress.

At step C, the anchor bolt drill is started to drill a drill hole along an axial direction of the rock test piece relative to a central hole of the anchor bolt chuck, and a torque, a rotation speed, and a drilling speed of the anchor bolt drill and a deformation of the rock test piece in the drilling process are recorded.

At step D, a drill rod is retreated after drilling is completed, the door plate where the hollow drawing oil cylinder is located is closed and fixed, and the test anchor bolt and an anchoring agent are directed into the drill hole simultaneously.

At step E, after the anchoring agent solidifies, a pretightening force is applied to the anchor bolt, and the steel strip, the anchor net and the tray are installed.

At step F, the force and deformation of the anchor bolt when the surrounding rocks are disturbed are simulated by adjusting the loading of the loading oil cylinders so as to really restore the force of the bolt-net structure after the anchored surrounding rocks are subjected to a secondary disturbance; or the combined supporting capability of the anchor bolt, the anchor net and the steel strip is tested by the hollow drawing oil cylinder, and a case of an increasing bearing capacity of the anchor bolt is simulated and restored by performing loading with the hollow drawing oil cylinder; if the influence of the dynamic load on the supporting structure can still be simulated by use of the impact loading oil cylinder rather than the hollow drawing oil cylinder, the force and deformation of the steel strip, the anchor net, the tray, the anchor bolt and the rock test piece in the loading process are recorded at the same time to analyze the experimental data so as to provide a basis for research of bolt-net combined supporting.

It can be known in combination with Example 1 and Example 2 that several anchor bolt detection experiments including an anchor bolt drawing experiment, an anchor bolt shear resistance experiment and an anchor bolt torsion experiment may be performed using the experimental device. The experimental machine may repeat the experiment by using the method, and thus the experiment is simple and convenient to operate. By using the experimental device, other unmentioned experiments may also be performed, including those experiments performed based on the structure of the experimental device of the present disclosure. In addition, the device may simulate the geostress environment of the surrounding rocks completely and simulate the drilling and installation of the anchor bolt drill hole accurately; after installation, the test of the combined supporting performance may be continued by using the device in combination with the anchor net and the steel strip. Further, on the whole, the device and the method have advantages of flexible operation and control, reflection of the actual engineering situations, simulation of real working environment and more accurate experimental results.

Example 3

Figure 15:
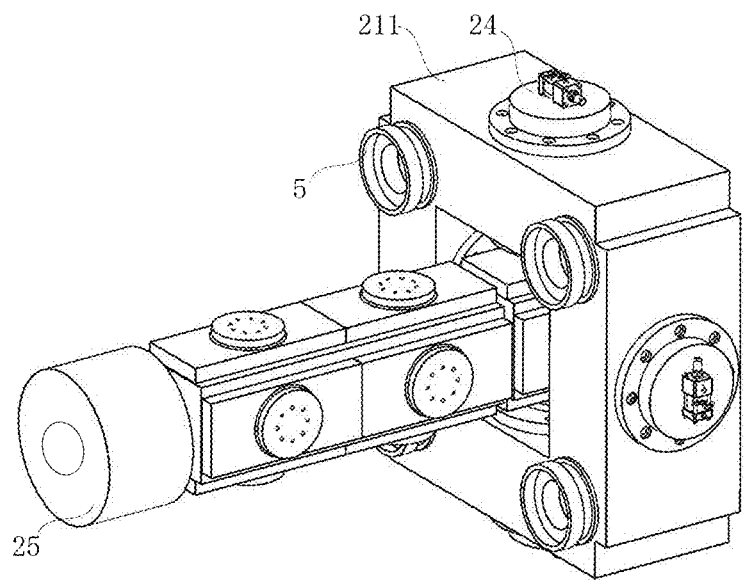
FIG. 15 is a schematic diagram illustrating an improved structure according to a third example of the present disclosure.

In this example, a bed-separation loading oil cylinder is disposed between the dual-shaft frames. As shown in FIG. 15, bed-separation anchoring control of a rock mass is simulated by the bed-separation loading oil cylinder to research a bed separation mechanism and characteristic, and an anchor bolt supporting mechanism and a supporting capacity.

An improvement of the experimental machine structure includes as follows: a bed-separation jack 5 is disposed between the dual-shaft frames 211, an upper part of the dual-shaft frame 211 slides along the pillar, and the dual-shaft frame 211 may slide along the through-groove 111 on the base. Experimental steps include: firstly, making a simulation test piece of a similar material or making a simulation test piece by taking a rock on site, polishing and flattening a surface of the simulation test piece, matching a size of the simulation test piece with a size of the space enclosed by the bearing plates, and placing the simulation test piece into the loading space enclosed by the bearing plates; then, performing loading, by the loading oil cylinder and the axial hollow lading oil cylinder, for the simulation test piece simultaneously to simulate actual roadway geostress, and drilling, by the anchor bolt drill, a drill hole of the anchor bolt on the simulation test piece; next, directing the anchor bolt and the anchoring agent into the drill hole simultaneously, and fixing the anchor bolt through the anchor bolt tray and the nut after the anchoring agent is solidified and applying a pretightening force, so as to complete anchoring and obtain the rock test piece anchored by the anchor bolt; and finally, loading by the bed-separation jack slowly, and recording stress, displacement and damage of the rock test piece in the loading process.

Example 4

Figure 16:
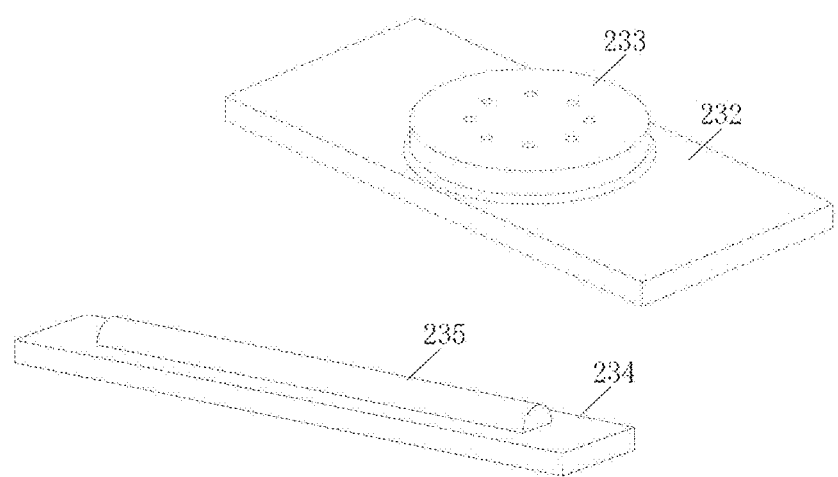
FIG. 16 is a schematic diagram illustrating an improved structure according to a fourth example of the present disclosure.

In this example, the bearing plate is improved to implement a torsion experiment of the anchored rock mass as shown in FIG. 16.

The improvement of the bearing plate 23 specifically includes as follows: a connection plate 233, a loading plate 234 and a connection shaft 235 are disposed, the connection shaft 235 is disposed between the connection plate 233 and the loading plate 234, the connection shaft 235 is semi-circular and engaged with a connection groove on the connection plate, the connection plate 233 is connected to a pressure head of the loading oil cylinder 24, and the test piece is loaded through the loading plate during loading to realize eccentric loading. Experimental steps include: firstly, making a simulation test piece of a similar material or making a simulation test piece by taking a rock on site, polishing and flattening a surface of the simulation test piece, matching a size of the simulation test piece with a size of the space enclosed by the bearing plates, and placing the simulation test piece into the loading space enclosed by the bearing plates; then, drilling, by the anchor bolt drill, the anchor bolt drill hole on the simulation test piece, directing the anchor bolt and the anchoring agent into the drill hole simultaneously, and fixing the anchor bolt through the anchor bolt tray and the nut after the anchoring agent is solidified and applying a pretightening force, so as to complete anchoring and obtain the rock test piece anchored by the anchor bolt; next, installing a torsion bearing plate on the dual-shaft frame loaded with a torsion force, and loading the torsion bearing plates staggeredly in a clockwise or counterclockwise direction; and finally, performing loading continuously until the rock test piece is damaged, and recording force, displacement and damage change situations of the rock test piece in the torsion loading process.

Example 5

The device for an anchor bolt (cable) supporting structure test and an anchoring system performance comprehensive experiment according to the above example may perform an anchor bolt (cable) test and an anchoring system comprehensive performance experiment, and the experiment further includes a shear experiment of the anchored rock mass.

The experimental machine for performing the experiment has at least 3 dual-shaft frames 211. The shear experiment of the anchored rock mass includes the following steps: firstly, making a simulation test piece of a similar material or making a simulation test piece by taking a rock on site, polishing and flattening a surface of the simulation test piece, matching a size of the simulation test piece with a size of the space enclosed by the bearing plates, and placing the simulation test piece into the loading space enclosed by the bearing plates; then, performing loading, by the loading oil cylinder and the axial hollow lading oil cylinder, for the simulation test piece simultaneously to simulate the actual roadway geostress, and drilling, by the anchor bolt drill, a anchor bolt drill hole on the simulation test piece; next, directing the anchor bolt and the anchoring agent into the drill hole simultaneously, and fixing the anchor bolt through the anchor bolt tray and the nut after the anchoring agent is solidified and applying a pretightening force so as to complete anchoring and obtain the rock test piece anchored by the anchor bolt; and finally, loading downward by the loading oil cylinder on the middle dual-shaft frame, loading upward by the loading oil cylinders on the dual-shaft frames at both sides of the middle dual-shaft frame so as to shear the rock test piece anchored by the anchor bolt, performing loading continuously until the rock test piece is damaged, and recording force, displacement and damage change situations of the rock test piece in the shear loading process.

Parts unmentioned in the present disclosure may be realized by adopting or referring to the prior art.

In addition, although the method of performing experiment by using the experimental machine is described in the present disclosure, other experiments may also be performed by using the experimental machine. The experimental methods in the present disclosure are only used to describe and explain the essence of the present disclosure more conveniently, and therefore, it is contrary to the spirit of the present disclosure that the methods are interpreted as any additional limitation.

Of course, the above descriptions are not used to limit the present disclosure, and the present disclosure also is not limited to the above examples. Variations, modifications, additions or substitutions made by those skilled in the art within the spirit of the present disclosure shall also fall in the scope of protection of the present disclosure.

The invention claimed is:

1. A device for an anchor bolt supporting structure test and an anchoring system performance comprehensive experiment comprising a gantry, a loading mechanism, a test mechanism and a test piece, wherein the gantry comprises a base and an operation platform, the loading mechanism comprises a loading frame, an anchor bolt chuck, a bearing plate, a hollow drawing oil cylinder and a plurality of loading oil cylinders, the loading frame is disposed on a through-groove of the base, the anchor bolt chuck is disposed at an end of the loading frame, and the loading oil cylinder is disposed at a side surface of the loading frame and acts on the bearing plate; the hollow drawing oil cylinder is disposed at an end of the loading frame and opposite to the anchor bolt chuck;

the test mechanism comprises a stress sensor and a displacement sensor, an acoustic emission probe, a torsion motor and an anchor bolt drill, the torsion motor and the anchor bolt drill are both disposed on the operation platform, the stress sensor and the displacement sensor are disposed on the bearing plate, and the acoustic emission probe is disposed on the loading frame;

the test piece comprises a steel strip, an anchor net, a tray, and a test anchor bolt, one end of the test anchor bolt is fixed at a side of the loading frame, and the other end of the test anchor bolt passes through the hollow drawing oil cylinder; wherein the hollow drawing oil cylinder is disposed on a door plate hinged with a connection support, and an anchor net fixing hole and a steel strip fixing hole are further disposed on the connection support; a hollow bearing plate is disposed at a loading end of the hollow drawing oil cylinder, the anchor net is pressed onto the hollow bearing plate, and the steel strip and the tray are pressed onto the anchor net sequentially.

2. The device according to claim 1, wherein the through-groove is disposed at an upper surface of the base, and a depth of the through-groove is greater than an exposed length of the installed loading oil cylinder; the operation platform is disposed opposite to the base, a sliding rail is disposed at an upper surface of the operation platform, a sliding block moves along the sliding rail in cooperation with the sliding rail, a sliding groove is further disposed at an upper surface of the sliding block, the anchor bolt drill and the torsion motor move along the sliding groove respectively or are fixed on the sliding groove, and sliding rollers are further disposed at both sides of the sliding grooves.

3. The device according to claim 1, wherein the loading frame comprises one or more dual-shaft frames, and two groups of loading oil cylinders distributed vertically and correspondingly are disposed on the dual-shaft frame to apply a load in a plane determined by the dual-shaft frame; an axial hollow loading oil cylinder is further disposed on the dual-shaft frame on which the anchor bolt chuck is connected along an axial direction of the test anchor bolt; four corners of the dual-shaft frames are connected through pillars and nuts, the bearing plate comprises a shear bearing plate and a plane bearing plate, and a loading end of the loading oil cylinder is connected to the shear bearing plate or the plane bearing plate.

4. An anchor bolt detection method using the device for an anchor bolt supporting structure test and an anchoring system performance comprehensive experiment according to claim 3, comprising steps of: firstly, fixing one end of the test anchor bolt on the anchor bolt chuck, and fixing the other end of the test anchor bolt on the hollow bearing plate through the nut and the tray; and then, performing axial loading by the hollow drawing oil cylinder, and recording a force and a deformation of the anchor bolt in the loading process.

5. An anchor bolt detection method using the device for an anchor bolt supporting structure test and an anchoring system performance comprehensive experiment according to claim 3, comprising steps of: firstly, connecting the shear bearing plate to the loading end of the loading oil cylinder, fixing one end of the test anchor bolt on the anchor bolt chuck, and adjusting a position of the shear bearing plate through the loading oil cylinder to engage the shear bearing plate with the test anchor bolt; then, fixing the other end of the test anchor bolt on the hollow bearing plate through the nut and the tray; and then, performing loading by the loading oil cylinder, and recording a force and a deformation of the anchor bolt in the loading process.

6. The device according to claim 1, wherein an acoustic emission probe installation groove is disposed at an inner side of the loading frame, and the displacement sensor and the force sensor are disposed on the bearing plates; torque, power and thrust monitoring devices are disposed on the anchor bolt drill, and a drilling scrap collection device is further disposed at a drilling side of the anchor bolt drill.

7. The device according to claim 3, wherein the test piece further comprises a rock test piece, the rock test piece is placed in a space enclosed by the plane bearing plates, and the shear bearing plate is staggeredly engaged with the test anchor bolt.

8. A method of testing a bolt-net combined supporting performance using the device for an anchor bolt supporting structure test and an anchoring system performance comprehensive experiment according to claim 7, comprising the following steps:

- at step A, installing the plane bearing plate on the loading end of the loading oil cylinder, transporting the rock test piece to a loading space between the plane bearing plates, and adjusting the loading oil cylinders and the axial hollow loading oil cylinder to clamp the rock test piece;
- at step B, opening the door plate where the hollow drawing oil cylinder is located, fixedly installing the anchor bolt drill on the operation platform, and adjusting the loading oil cylinders and the axial hollow loading oil cylinder to perform loading respectively so as to simulate actual geostress;
- at step C, starting the anchor bolt drill to drill a drill hole along an axial direction of the rock test piece relative to a central hole of the anchor bolt chuck, and recording a torque, a rotation speed, a power, a thrust and a drilling speed of the anchor bolt drill and a deformation of the rock test piece in the drilling process;
- at step D, retreating a drill rod after drilling is completed, closing the door plate where the hollow drawing oil cylinder is located, and directing the test anchor bolt and an anchoring agent into the drill hole simultaneously;
- at step E, after the anchoring agent is solidified, applying a pretightening force to the anchor bolt, and installing the steel strip, the anchor net and the tray; and
- at step F, simulating the force and deformation of the anchor bolt when surrounding rocks are disturbed by adjusting the loading oil cylinders; or testing a combined supporting capacity of the anchor bolt, the anchor net and the steel strip by performing loading with the hollow drawing oil cylinder; at the same time, recording force and deformation of the steel strip, the anchor net, the tray, the anchor bolt and the rock test piece in the loading process.

9. An anchor bolt detection method using the device for an anchor bolt supporting structure test and an anchoring system performance comprehensive experiment according to claim 1, comprising steps of: firstly, fixing one end of the test anchor bolt on the anchor bolt chuck, opening the door plate where the hollow drawing oil cylinder is located, and fixedly installing the torsion motor on the operation platform; then, fixing the other end of the test anchor bolt on the torsion motor of the operation platform; and then, applying a load to the anchor bolt through the torsion motor, and recording a torque and a rotation speed and an anchor bolt deformation in the loading process.

* * * * *